United States Patent
Suzuki et al.

(10) Patent No.: US 12,287,779 B2
(45) Date of Patent: Apr. 29, 2025

(54) TRANSACTION PROCESSING SYSTEM AND METHOD

(71) Applicant: Scalar, Inc., Tokyo (JP)

(72) Inventors: Toshihiro Suzuki, Tokyo (JP); Hiroyuki Yamada, Kamakura (JP)

(73) Assignee: Scalar, Inc., Tokyo (JP)

(*) Notice: Subject to any disclaimer, the term of this patent is extended or adjusted under 35 U.S.C. 154(b) by 0 days.

(21) Appl. No.: 18/688,309

(22) PCT Filed: Sep. 2, 2022

(86) PCT No.: PCT/JP2022/033166
§ 371 (c)(1),
(2) Date: Feb. 29, 2024

(87) PCT Pub. No.: WO2023/033153
PCT Pub. Date: Mar. 9, 2023

(65) Prior Publication Data
US 2024/0378192 A1    Nov. 14, 2024

(30) Foreign Application Priority Data
Sep. 3, 2021  (JP) .................. 2021-144133

(51) Int. Cl.
*G06F 16/23* (2019.01)
(52) U.S. Cl.
CPC ...... *G06F 16/2379* (2019.01); *G06F 16/2315* (2019.01)
(58) Field of Classification Search
CPC .... G06F 16/2379; G06F 16/2315; G06F 9/46; G06F 9/466
See application file for complete search history.

(56) References Cited

U.S. PATENT DOCUMENTS

2020/0110739 A1*  4/2020  Liu ............... G06F 16/2365
2020/0257676 A1*  8/2020  Zhang ............ G06F 12/0866

FOREIGN PATENT DOCUMENTS

JP     2007-188518 A     7/2007

OTHER PUBLICATIONS

Optimistic Partitioned Operation in Distributed Database Systems (Year: 1986).*

(Continued)

*Primary Examiner* — Hau H Hoang
(74) *Attorney, Agent, or Firm* — Procopio, Cory, Hargreaves & Savitch LLP

(57) ABSTRACT

In an architecture including a plurality of sub-application units and a plurality of CC-OCCs (Client-Coordinated transaction managers that perform Optimistic Concurrency Control) included in a plurality of data source client systems, consistency of a plurality of snapshots managed by a plurality of CC-OCCs is maintained for each transaction. With respect to each transaction, when the number of CC-OCCs which receive a read request and/or a write request for an object from two or more sub-application units in processing of M-number of (where M is an integer of 2 or more) sub-transactions that constitute the transaction is N (where N is an integer of 2 or more), N-number of unions are pairwise disjoints. With respect to each of the N-number of unions, the union is a union of a read set and a write set in a snapshot which corresponds to the transaction and which is managed by a CC-OCC.

6 Claims, 13 Drawing Sheets

(56) References Cited

OTHER PUBLICATIONS

H. T. Kung and John T. Robinson, On Optimistic Methods for Concurrency Control. ACM Transactions on Database Systems, vol. 6, No. 2, Jun. 1981, pp. 213-226. (https://citeseerx.Ist.psu.edu/viewdoc/summary?doi=10.1.1.101.8988) cited in the original specification, in 14 pages.

International Search Report received in International Application No. PCT/JP2022/033166, dated Nov. 8, 2022, in 5 pages (with translation).

Office Action received in JP 2021-144577, dated Oct. 5, 2021, in 12 pages (with translation).

\* cited by examiner

FIG. 6

MAPPING TABLE
201

| CC-OCC ID | SUB-APPLICATION UNIT ID | RECORD ID |
|---|---|---|
| 19SA | 18A | 001-100 |
| 19SB | 18B | 101-200 |
| ... | ... | ... |

TRANSACTION PROCESSING SYSTEM AND METHOD

TECHNICAL FIELD

The present invention generally relates to processing of transactions.

BACKGROUND ART

Generally, a transaction is processed in execution of a business logic that implements a service. Generally, a transaction refers to a set of atomically processed operations and is made up of, for example, a plurality of CRUD (Create, Read, Update, or Delete) requests. In transaction processing, CRUD requests have to be processed while guaranteeing ACID (Atomicity, Consistency, Isolation, and Durability) with respect to a plurality of objects.

In transaction processing, a read and/or a write of an object is performed by a data source client system, which is a client system corresponding to the data source server system, on a data source server system including a plurality of objects (for example, a plurality of records).

As transaction processing, transaction processing including OCC (Optimistic Concurrency Control) is known (for example, NPL 1). In OCC, validation is performed based on a snapshot when committing. A snapshot exists for each transaction. With respect to each transaction, a snapshot includes a read set, which is a set of zero or more read objects, and a write set, which is a set of zero or more write objects. With respect to each transaction, a read object is an object having been read during processing of the transaction. With respect to each transaction, a write set is an object to be written during processing of the transaction.

CITATION LIST

Non Patent Literature

[NPL 1] H. T. KUNG and JOHN T. ROBINSON. On Optimistic Methods for Concurrency Control. ACM Transactions on Database Systems, Vol. 6, No. 2, June 1981, Pages 213-226. (https://citeseerx.ist.psu.edu/viewdoc/summary?doi=10.1.1.101.8988)

SUMMARY OF INVENTION

Technical Problem

Generally, a business logic is executed by an application unit. The application unit is software (typically, an application program) (or a function implemented by executing the software). During processing of a transaction, the application unit transmits a request for a read and/or a write of an object to a Tx (transaction) manager.

Dividing a business logic (for example a service) into a plurality of sub-business logics (for example, a plurality of micro-services) or, in other words, constructing a single business logic from a plurality of sub-business logics is known. In this case, a plurality of sub-application units that execute the plurality of sub-business logics are to be designed.

When an architecture including a plurality of sub-application units as described above is adopted, a plurality of sub-transactions that constitute one transaction are to be processed.

In addition, given that a plurality of Tx managers are included in a plurality of data source client systems, a client-coordinated Tx manager is conceivably adopted as each Tx manager for reasons such as implementing a transaction function in a data source client system which is not equipped with a transaction function. Hereinafter, a client-coordinated Tx manager that performs OCC will be notated as a "CC-OCC". Each of a plurality of CC-OCCs manages a snapshot for each transaction. Note that in the present specification, adopting a "client-coordinated Tx manager" as a Tx manager means arranging Tx managers that are generally arranged in a data source server system in a data source client system instead of a data source server system and, at the same time, not exchanging information through communication or the like between the Tx managers arranged in the data source client system. In addition, a CC-OCC "managing a snapshot" means storing a snapshot in a data source client system (for example, a memory of the data source client system) which includes the CC-OCC and the snapshot may be provided inside or outside the CC-OCC.

In an architecture including a plurality of sub-application units and a plurality of CC-OCCs included in a plurality of data source client systems, it is difficult to maintain consistency of a plurality of snapshots when processing a plurality of transactions in parallel. Hereinafter, an example will be described with reference to FIGS. 1A to 2B. Note that the following premises and terms (hereinafter, referred to as a "glossary" for the sake of convenience) will be used in the description. In addition, the sub-application units may be provided inside or outside the data source client system.

- The service is a service of "awarding a predetermined point to each of a plurality of member accounts that belong to a family account when a sum of a plurality of points in the plurality of member accounts exceeds a predetermined value".
- Member accounts A and B are a plurality of member accounts that belong to a given family account. Member accounts C and D are a plurality of member accounts that belong to another family account.
- Points in a plurality of member accounts are recorded in DBs (databases) 521A and 521B (note that there may be one DB 521 or three or more DBs 521) in a server system 15 (an example of a data source system).
- A record X (X=A, B, C, or D) refers to a single record on which a point in a member account X is recorded.
- A read X refers to a read of the record X.
- A write X refers to a write of the record X.
- A read record X: the record X having been read by the read X which is a record included in a read set in a snapshot.
- A write record X: the record X to be written by the write X which is a record included in a write set in a snapshot.
- Tx1 is constituted of reads A to D and writes A to D. Each of the writes A and B in Tx1 is performed in order to add a predetermined point when a sum of points that are recorded in the member accounts A and B belonging to a same family account (records A and B having been read by reads A and B) exceeds a predetermined value (each of the writes C and D in Tx1 is performed in a similar manner).
- DB is an abbreviation of a database and represents an example of a data source.

As illustrated in FIG. 1A, a DB client system 531 includes an application unit 518 and a Tx manager 519 and the Tx manager 519 is configured to access DBs 521A and 521B.

In an architecture in which one application unit 518 in the DB client system 531 executes one business logic, consistency of a snapshot 5 that is managed by the Tx manager 519 that performs OCC can be readily maintained. For example, as shown in FIG. 1B, when read B and write B of Tx2 are performed before write B of Tx1, the Tx manager 519 can detect that the consistency of the snapshot 5 has been disrupted and, therefore, abort Tx1.

However, as illustrated in FIG. 2A, in an architecture in which DB client systems 531A and 531B include sub-application units 418A and 418B and CC-OCCs 419A and 419B, it is difficult to maintain consistency of a snapshot 5A managed by the CC-OCC 419A and a snapshot 5B managed by the CC-OCC 419B. For example, in the architecture illustrated in FIG. 2A, an isolation level of transactions is assumed to be an isolation level at which a Read-skew anomaly occurs in addition to a Write-skew anomaly and a Read-only anomaly of Snapshot Isolation. In addition, as shown in FIG. 2B, let us assume that Tx1 is divided into two sub-transactions (Tx$1_{Sub1}$ and TX$1_{Sub2}$). Let us assume that Tx$1_{Sub1}$ is constituted of reads A to D, write A, and write C and that Tx$1_{Sub2}$ is constituted of reads A to D, write B, and write D. Let us assume that the sub-application unit 418A first processes Tx$1_{Sub1}$ and, subsequently, the sub-application unit 418B processes Tx2 and then Tx$1_{Sub2}$. In this case, since the record B is updated by write B of Tx2, a read skew occurs in which the record B read by read B of Tx$1_{Sub2}$ is newer than the record B read by read B of Tx$1_{Sub1}$. However, in an architecture adopting client-coordinated, neither CC-OCC 421A nor CC-OCC 421B are able to detect that a read skew has occurred and, therefore, both Tx$1_{Sub1}$ and Tx$1_{Sub2}$ end up committing despite the record B being inconsistent between the snapshots 5A and 5B.

Solution to Problem

A transaction processing system includes: a plurality of sub-application units which execute a plurality of sub-business logics that constitute a business logic for implementing a service; and a plurality of CC-OCCs. The plurality of CC-OCCs are included in a plurality of data source client systems. The plurality of data source client systems are a plurality of client systems corresponding to a data source server system which includes a plurality of objects. The data source server system and the plurality of data source client systems are one or a plurality of computer systems. Each object is data representing a state of a target.

Each of the plurality of sub-application units transmits, in executing a sub-business logic, a read request and/or a write request for an object to be read and/or written to a CC-OCC in charge of the object in a data source client system including the sub-application unit.

Each of the plurality of CC-OCCs is a CC (Client Coordinated) transaction manager configured to perform OCC (Optimistic Concurrency Control). Each of the plurality of CC-OCCs is configured to manage a snapshot for each transaction.

With respect to each transaction, a snapshot of the transaction includes a read set, which is a set of zero or more read objects, and a write set, which is a set of zero or more write objects. A read object is an object having been read in response to a read request for the object. A write object is an object to be written in response to a write request for the object.

With respect to each transaction, when CC-OCCs which receive a read request and/or a write request for an object from two or more sub-application units in processing of M-number of (where M is an integer of 2 or more) sub-transactions that constitute the transaction are N-number of (where N is an integer of 2 or more) CC-OCCs, N-number of unions are pairwise disjoints. With respect to each of the N-number of unions, the union is a union of a read set and a write set in a snapshot which corresponds to the transaction and which is managed by a CC-OCC. With respect to each of the M-number of sub-transactions, the sub-transaction is processed in executing a sub-business logic and includes a read request and/or a write request for an object from a sub-application unit to an CC-OCC.

Advantageous Effects of Invention

In an architecture including a plurality of sub-application units and a plurality of CC-OCCs included in a plurality of data source client systems, consistency of a plurality of snapshots managed by a plurality of CC-OCCs can be maintained for each transaction.

BRIEF DESCRIPTION OF DRAWINGS

FIG. 6 shows a configuration example of a mapping table.

DESCRIPTION OF EMBODIMENT

Figure 1A:
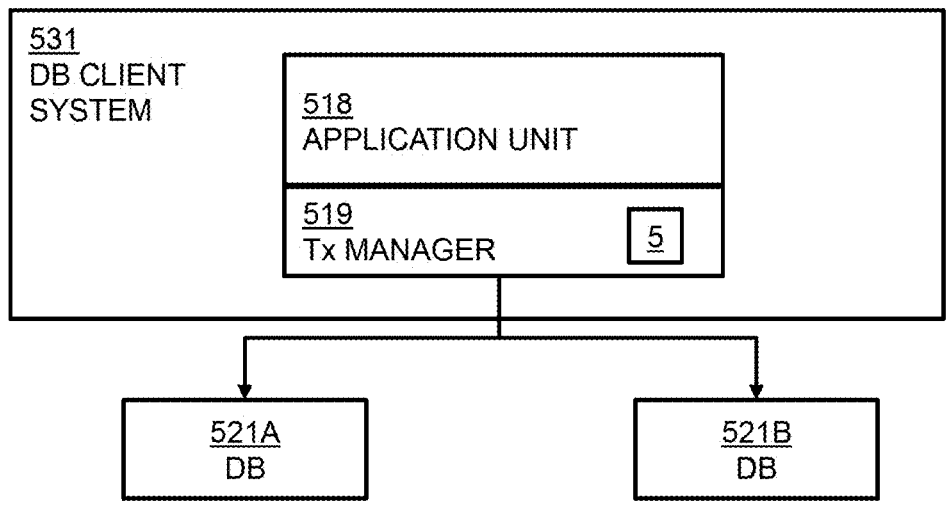
FIG. 1A shows an architecture according to a first comparative example.
Figure 1B:
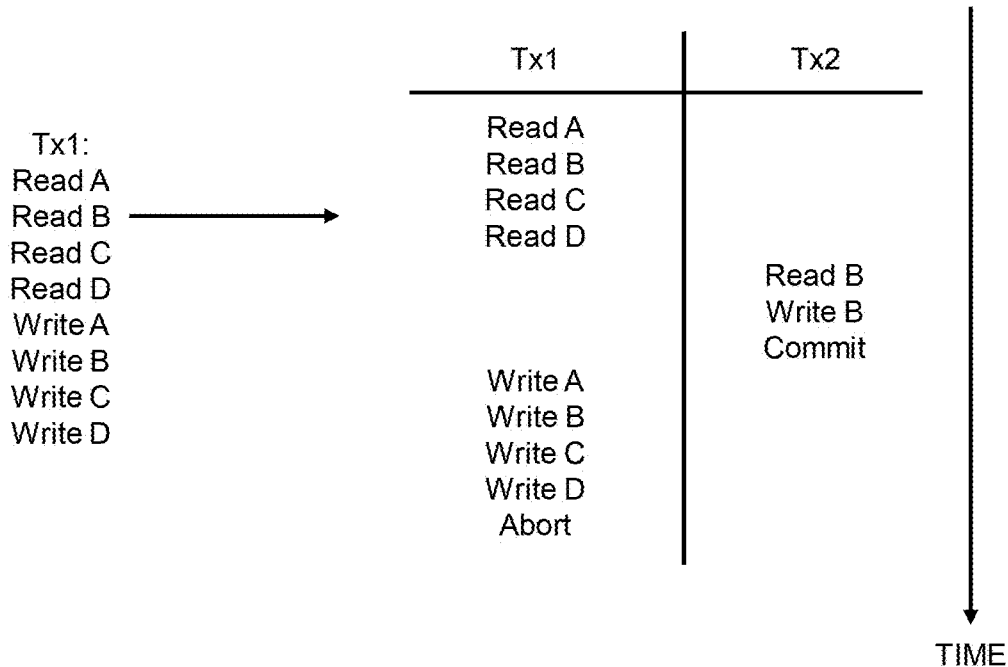
FIG. 1B shows flows of Tx1 and Tx2 in the first comparative example.

In the following description, an "interface apparatus" includes one or more interfaces. The one or more interfaces may be one or more communication interface devices of a same kind (for example, one or more NICs (Network Interface Cards)) or two or more communication interface devices of different kinds (for example, an NIC and an HBA (Host Bus Adapter)).

In addition, in the following description, a "storage apparatus" includes one or more memories. At least one memory of the storage apparatus may be a volatile memory. The storage apparatus is mainly used during processing by a processor. In addition to memories, the storage apparatus may include one or more non-volatile storage devices (for example, an HDD (Hard Disk Drive) or an SSD (Solid State Drive)).

Furthermore, in the following description, a "processor" includes one or more processors. At least one processor is typically a microprocessor such as a CPU (Central Processing Unit). Each of the one or more processors may be single-core or multi-core. The processor may include a hardware circuit which performs a part of or all of processing.

In addition, in the following description, while processing may be described using a "program" as a subject, since the program performs prescribed processing using a storage apparatus (for example, a memory) and/or an interface apparatus (for example, a communication port) and the like as appropriate by being executed by the processor, the processor may be considered a subject of the processing. Processing described using the program as a subject may be considered processing performed by the processor or by an apparatus including the processor. In addition, the processor may include a hardware circuit (for example, an FPGA (Field-Programmable Gate Array) or an ASIC (Application Specific Integrated Circuit)) which performs a part of or all of the processing. The program may be installed onto an apparatus such as a computer from a program source. For example, the program source may be a program distribution server or a computer-readable recording medium (for example, a non-transitory recording medium). In addition, in the following description, two or more programs may be implemented as one program or one program may be implemented as two or more programs.

Furthermore, in the following description, while a function may be described using expressions such as a "yyy unit", a function may be realized when one or more computer programs are executed by a processor, may be realized by one or more hardware circuits (for example, an FPGA or an ASIC), or may be realized by a combination thereof. In a case where a function is realized when a program is executed by a processor, since prescribed processing is performed while using a storage apparatus and/or an interface apparatus or the like as appropriate, the function may be considered at least a part of the processor. Processing described using a function as a subject may be considered processing performed by a processor or an apparatus including the processor.

In addition, in the following description, common signs among reference signs may be used when describing elements of a same kind without distinction but reference signs may be used when distinguishing elements of a same kind from one another.

Furthermore, in the following description, a "record" refers to a block of logical electronic data as viewed from a program such as an application program and is, specifically, an example of an object which is data representing a state of a target. For example, data as a record is a key-value pair or a tuple.

In addition, a "target" is any tangible entity or an intangible entity. For example, an account can be adopted as a "target" and points in the account can be adopted as a state of the target.

Furthermore, "a read and/or a write" means one of or both of a read and a write and may be collectively referred to as "a read write access". In a similar manner, "a read request and/or a write request" means one of or both of a read request and a write request and may be collectively referred to as "a read write access request".

Figure 2A:
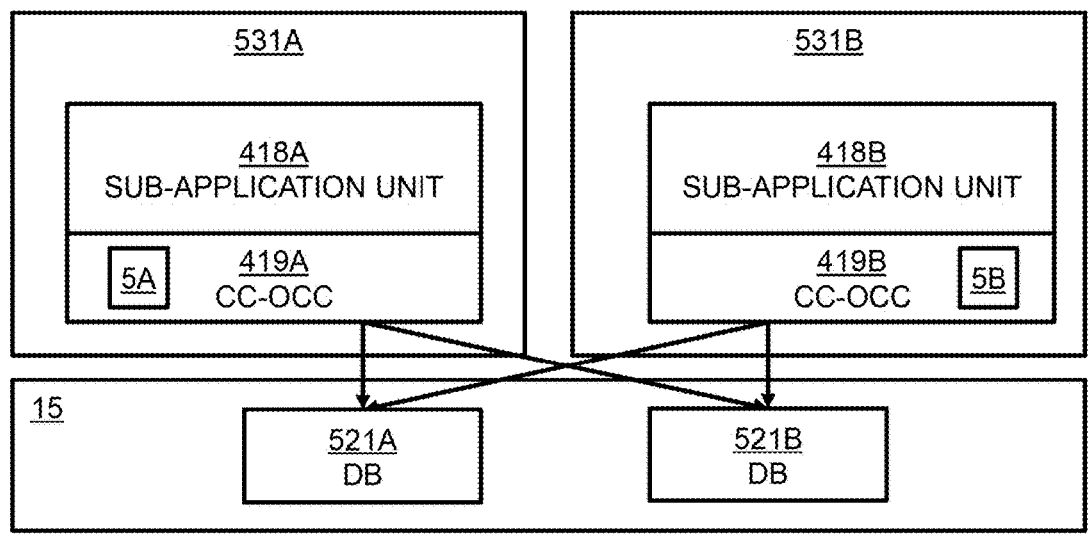
FIG. 2A shows an architecture according to a second comparative example.
Figure 2B:
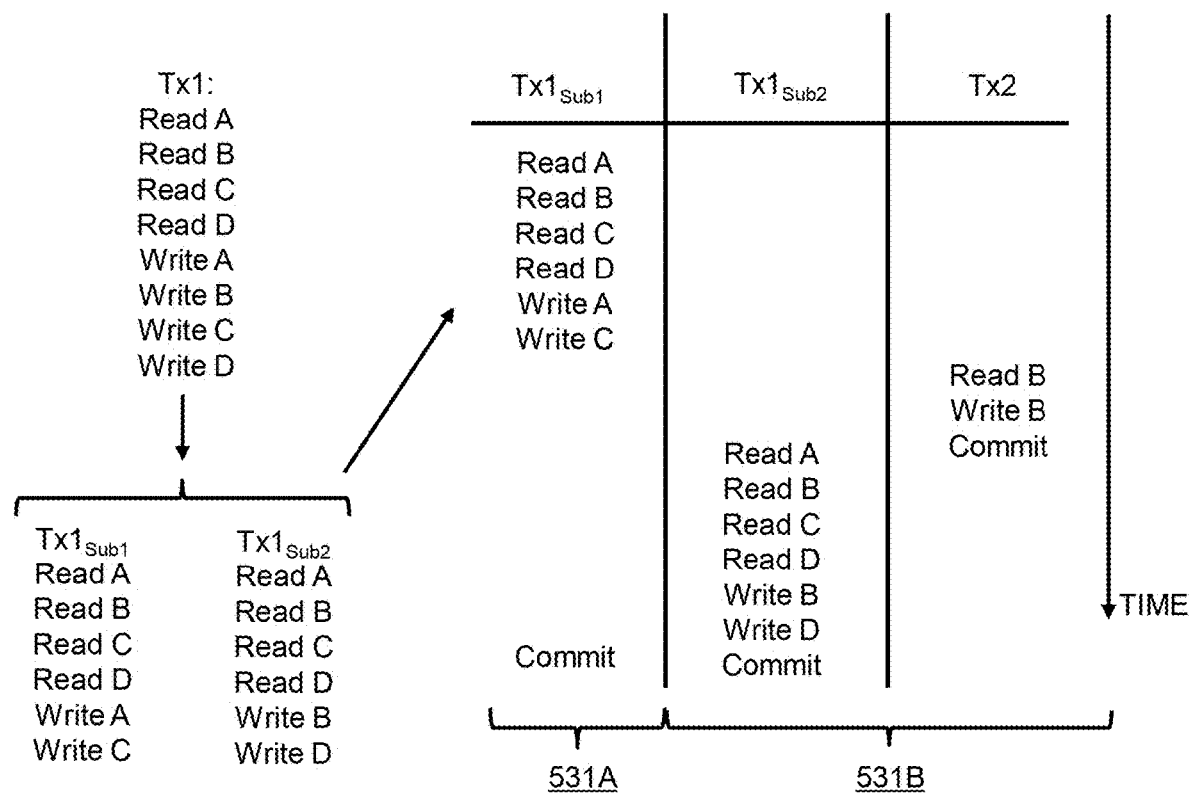
FIG. 2B shows flows of Tx1 and Tx2 in the second comparative example.

Hereinafter, an embodiment of the present invention will be described. Note that the following description adopts the glossary described earlier and used in the description of FIGS. 1A and 2B.

Figure 3:
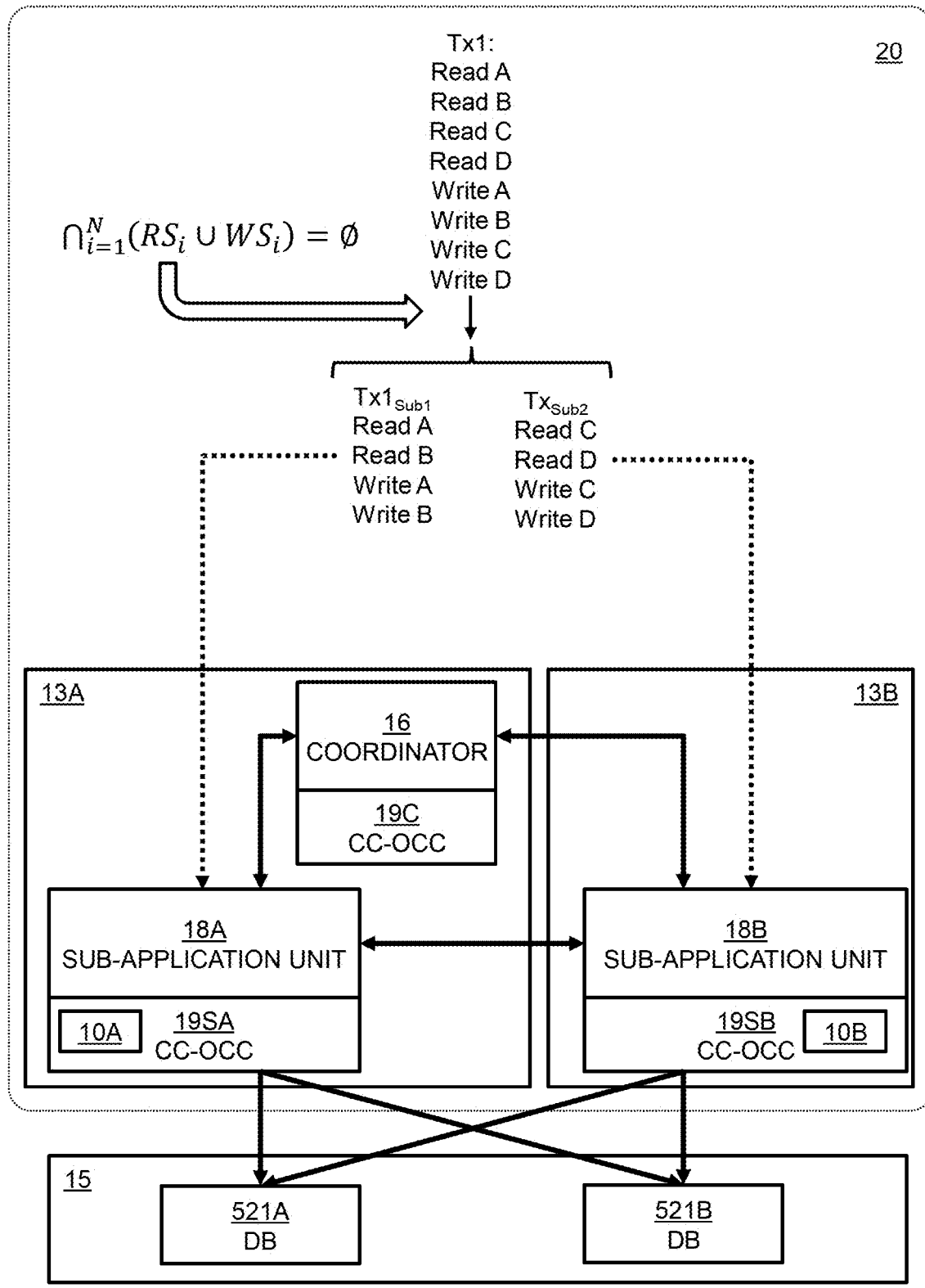
FIG. 3 shows an example of an outline of an embodiment.

FIG. 3 shows an example of an outline of the embodiment.

A plurality of DB client systems 13 (for example, DB client systems 13A and 13B) exist with respect to a DB server system 15 including one or more DBs 521 (for example, DBs 521A and 521B). The one or more DBs 521 are an example of the data source, the DB server system 15 is an example of the data source server system, and the DB client systems 13 are an example of the data source client system.

A transaction processing system 20 includes a plurality of sub-application units 18 and a plurality of CC-OCCs 19. At least the plurality of CC-OCCs 19 among the plurality of sub-application units 18 and the plurality of CC-OCCs 19 are included in the plurality of DB client systems 13.

A plurality of sub-business logics that constitute a business logic are to be executed by the plurality of sub-application units 18. The plurality of sub-business logics may be determined from any perspective. For example, when a business logic is constituted of order processing and payment processing, the plurality of sub-business logics may be sub-business logics with different functions such as a sub-business logic as order processing and a sub-business logic as payment processing or sub-business logics which perform both order processing and payment processing but have different accessible record ranges. The plurality of sub-business logics may be defined in advance (for example, a sub-business logic may be defined in advance in the sub-application units 18) or the plurality of sub-business logics may be dynamically created (for example, by a coordinator 16 to be described later) from the business logic.

Since the CC-OCCs 19 are client-coordinated Tx managers, communication between the CC-OCCs 19 is not performed. In consideration thereof, each sub-application unit 18 is provided with a function for communicating between the sub-application units 18. For ease of explanation, let us assume that one CC-OCC 19 exists in one sub-application unit 18 and that the sub-application unit 18 and the CC-OCC 19 are provided in one DB client system 13. Let a reference sign of the CC-OCC 19 of the sub-application unit 18 be "19S". The CC-OCC 19S is a CC-OCC which accepts a read request and/or a write request for a record in processing of the transaction (processing of a plurality of sub-transactions that constitute the transaction). For each transaction, the CC-OCC 19S manages a snapshot 10 (a read set and a write set) (for example, stores in a memory of the DB client system 13). The read set is a set of 0 or more read records. A read record is a record having been read on a memory. The write set is a set of 0 or more write records. A write record is a record to be written on a memory.

In addition, the coordinator 16 of the transaction is provided. The coordinator 16 performs coordination such as starting a transaction, preparation processing, commit processing, and rollback processing. As will be described later, the coordinator 16 may transmit an execution request for a sub-business logic to the sub-application unit 18 (the transmission of the execution request for a sub-business logic to the sub-application unit 18 may be performed by another sub-application unit 18). The coordinator 16 may exist for each transaction or may be common to a plurality of transactions. The coordinator 16 may exist inside at least one sub-application unit 18 or may exist outside of at least one sub-application unit 18. The coordinator 16 may exist in the DB client system 13 or may exist outside of the DB client system 13. For ease of explanation, let us assume that one coordinator 16 common to a plurality of transactions exists outside of the sub-application units 18 and that one CC-OCC 19 exists in one coordinator 16. Let a reference sign of the CC-OCC 19 of the coordinator 16 be "19C". Let us assume that the coordinator 16 and the CC-OCC 19C exist in the DB client system 13A.

A transaction is constituted of a plurality of operations and atomically processed by a Tx manager (in the present embodiment, the CC-OCC 19S). The transaction is constituted of a plurality of sub-transactions or, in other words, the transaction is divided into a plurality of sub-transactions. The sub-transactions include a read request and/or a write request for a record from the sub-application unit 18 to the CC-OCC 19S. The CC-OCC having received the read request and/or the write request for the record reads the record from the DB 521 and/or writes the record to the DB 521.

In execution of a plurality of sub-business logics that constitute a business logic, a plurality of sub-transactions that constitute a transaction are processed. Let us assume that the plurality of sub-transactions are M-number of (where M is an integer of 2 or more) sub-transactions. In addition, let us assume that the CC-OCCs 19S which receive a read request and/or a write request for a record from two or more sub-application units 18 in processing of the plurality of sub-transactions are N-number of (where N is an integer of 2 or more) CC-OCCs 19S. For ease of explanation, in the present embodiment, let us assume that M=N and, therefore, sub-transactions and CC-OCCs 19S correspond to each other on a one-to-one basis. A sub-business logic is transmitted to a sub-application unit 18 by the coordinator 16 and the sub-transactions are processed by the sub-application unit 18.

In the present embodiment, the following invariant is satisfied for each transaction.

$$\bigcap_{i=1}^{N} (RS_i \cup WS_i) = \emptyset \qquad \text{[Math. 1]}$$

In the invariant, N denotes the number of sub-transactions. In the invariant, i denotes a serial number (for example, an ID) of a sub-transaction. $RS_i$ denotes a read set of a sub-transaction i. $WS_i$ denotes a write set of the sub-transaction i.

Therefore, this invariant means that "a union of a read set and a write set for each sub-transaction that constitutes a transaction is pairwise disjoint (relatively prime) with respect to all sub-transactions that constitute the transaction". For example, let us assume that the service described with reference to FIG. 2B and Tx1 are present as a service and a transaction. In this case, since sub-transactions and CC-OCCs 19S correspond to each other on a one-to-one basis in the present embodiment, there are two sub-transactions that constitute Tx1 as shown in FIG. 3. In addition, two unions (unions (i=1, 2) of $RS_i$ and $WS_i$) corresponding to the two sub-transactions must be pairwise disjoints. For this reason, Tx1 is divided into Tx1$_{Sub1}$ (read A, read B, write A, and write B) and Tx1$_{Sub2}$ (read C, read D, write C, and write D). Tx1$_{Sub1}$ is allocated to CC-OCC 19SA and TX1$_{Sub2}$ is allocated to CC-OCC 19SB. Accordingly, a state where the invariant or, in other words, the union (union of $RS_1$ and $WS_1$) in a snapshot 10A of the CC-OCC 19SA and the union (union of $RS_2$ and $WS_2$) in a snapshot 10B of the CC-OCC 19SB are pairwise disjoints is maintained. Note that a method of maintaining an invariant is not limited to transaction division and sub-transaction allocation as described above. An example of a method of maintaining an invariant will be described later.

In addition, the invariant need only be satisfied for each transaction as described above. In other words, a union of a read set and a write set need not be a pairwise disjoint between transactions. For example, when a read record A or a write record A is included in the snapshot 10A of the CC-OCC 19SA, the record A must not be included in the snapshot 10B of the CC-OCC 19SB with respect to Tx1 but the record A may be included in the snapshot 10B of the CC-OCC 19SB with respect to Tx2 that is a different Tx from Tx1 (in this case, the record A must not be included in the snapshot 10A of the CC-OCC 19SA with respect to Tx2).

Since the invariant described above is satisfied for each transaction, in an architecture including a plurality of sub-application units 18 and a plurality of CC-OCCs 19S included in a plurality of DB client systems 13, consistency of a plurality of snapshots 10 managed by a plurality of CC-OCCs 19S can be maintained for each transaction.

Hereinafter, the present embodiment will be described in detail.

Figure 4:
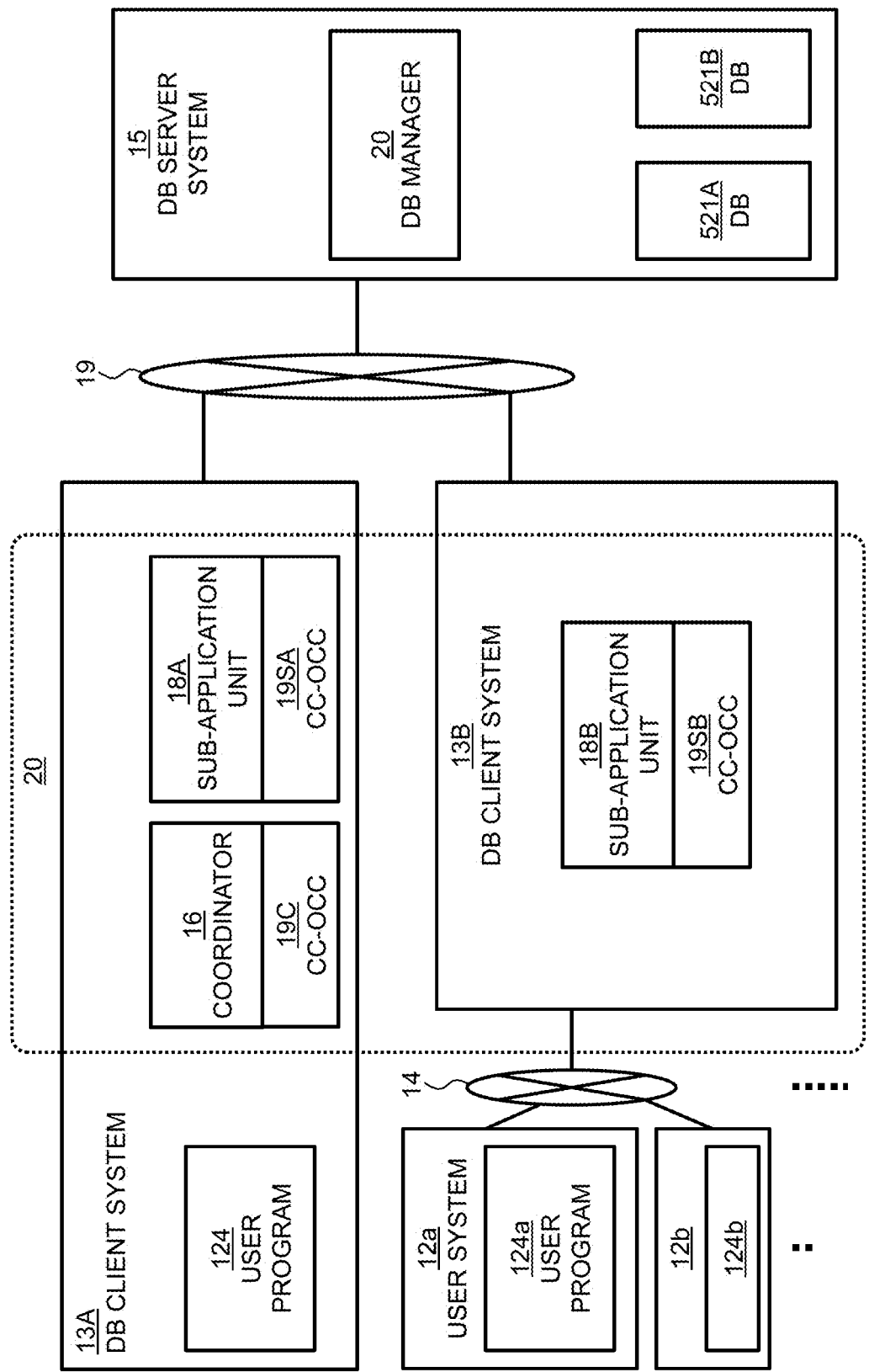
FIG. 4 shows an example of a configuration of an entire system according to the embodiment.

FIG. 4 shows an example of a configuration of an entire system according to the present embodiment.

The plurality of DB client systems 13A, 13B, . . . and the DB server system 15 are connected so as to be capable of communication via a communication network 19.

Any configuration may be adopted as the configuration of the DB client system 13.

For example, the DB client system 13A may be a client system including a user program 124 in addition to the sub-application unit 18A, the CC-OCC 19SA, the coordinator 16, and the CC-OCC 19C. In addition, the DB client system 13B may be a DB client system connected via a communication network 14 to a user system 12 that executes the user program 124. The user system 12 may be a computer (for example, a personal computer) of a user. The user program 124 may be a web browser or an application program. The communication network 14 may be integrated with the communication network 19.

While the DB client system 13 is a client system with respect to the DB server system 15, the DB client system 13 may be a server system with respect to the user system 12. The DB client system 13 may be a client system (end client) in a system as a whole.

In addition, the sub-application unit 18 may exist in a system (for example, the user system 12) outside of the DB client system 13. Furthermore, the sub-application unit 18 may function as a server application or as a desktop application. Moreover, the sub-application unit 18 may be provided to a system such as the DB client system 13 or the user system 12 via a network.

The DB server system 15 includes a plurality of DBs 21 (or one DB 21) and a DB manager 20 which inputs and outputs data with respect to the DB 21 in response to a request from the CC-OCC 19S.

The DB server system 15 and the plurality of DB client systems 13 are one or a plurality of computer systems. For example, the DB server system 15 and the DB client systems 13 may be separate computer systems or one common computer system.

Figure 5:
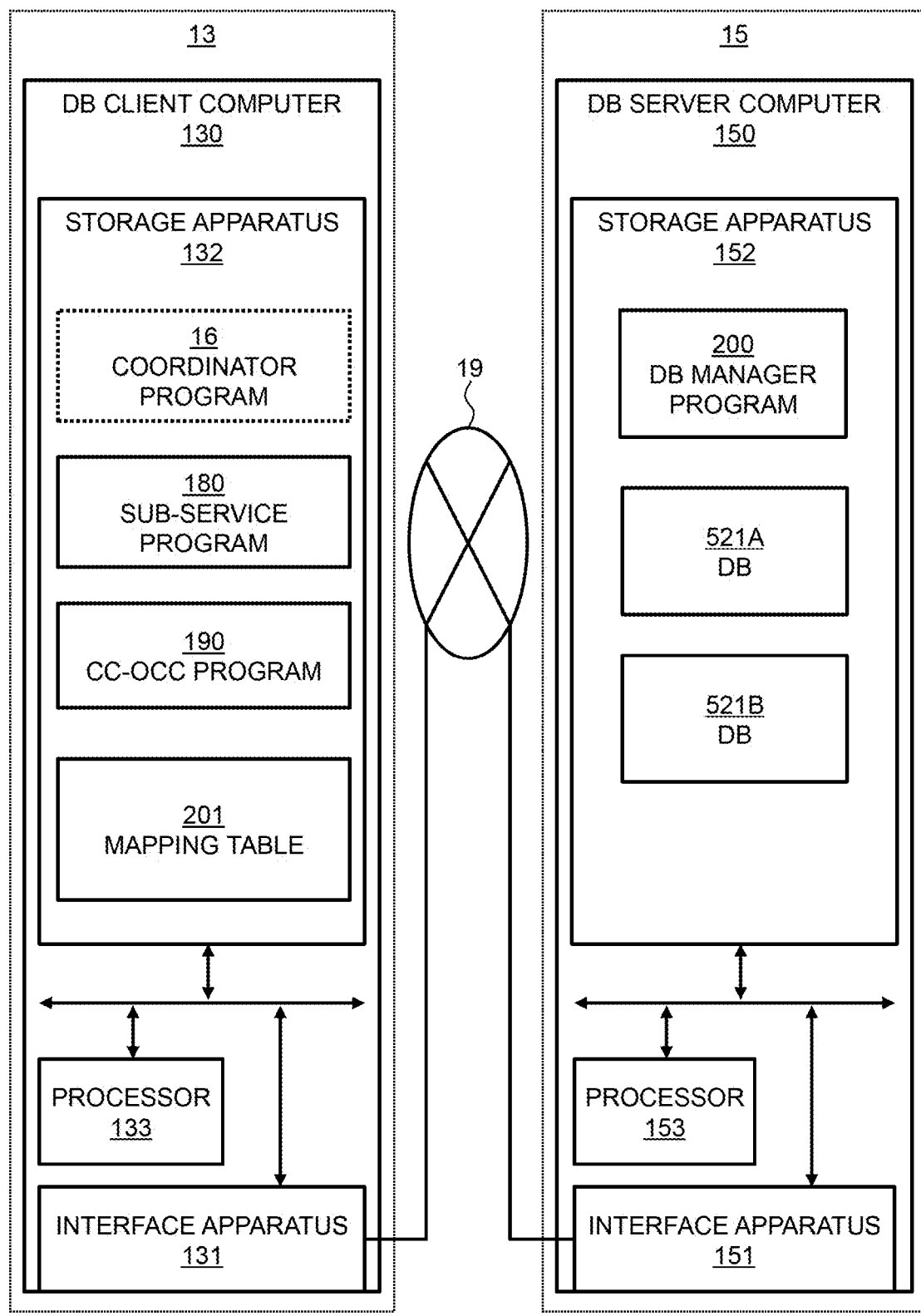
FIG. 5 shows an example of a configuration of a DB client system and a DB server system.

FIG. 5 shows an example of a configuration of the DB client system 13 and the DB server system 15.

The DB client system 13 includes one or a plurality of DB client computers 130. Since there may be one DB client computer 130 included in the DB client system 13, the one DB client computer 130 may constitute one DB client system 13.

The DB client computer 130 includes an interface apparatus 131, a storage apparatus 132 (including a memory), and a processor 133 coupled to the interface apparatus 131 and the storage apparatus 132.

The interface apparatus 131 is coupled to the communication network 19.

The storage apparatus 132 stores a sub-service program 180 and a CC-OCC program 190 (and a coordinator program 160). The sub-application unit 18 and the CC-OCC 19 (and the coordinator 16) are realized when the programs are executed by the processor 133. In addition, the storage apparatus 132 stores a mapping table 201 to be described later.

The DB server system 15 includes one or a plurality of DB server computers 150. Since there may be one DB server computer 150 included in the DB server system 15, the one DB server computer 150 may constitute the DB server system 15.

The DB server computer 150 includes an interface apparatus 151, a storage apparatus 152, and a processor 153 coupled to the interface apparatus 151 and the storage apparatus 152.

The interface apparatus 151 is coupled to the communication network 19.

The storage apparatus 152 stores a DB manager program 200. The DB manager 200 is realized when the program is executed by the processor 153. In addition, the storage apparatus 152 stores the DB 521.

FIG. 6 shows a configuration example of the mapping table 201.

The mapping table 201 is a table which is stored in each DB client system 13 and which is referenced by the sub-application unit 18. The mapping table 201 may exist for each sub-application unit 18 or may exist for each CC-OCC 19S. In addition, in each DB client system 13, the mapping table 201 may exist for each transaction or may be common to all transactions. Furthermore, the mapping table 201 may be prepared in advance or may be dynamically created by, for example, the coordinator 16. In the present embodiment, it is assumed that the mapping table 201 is prepared in advance for each transaction and for each sub-application unit 18.

The mapping table 201 represents which CC-OCC 19S of which sub-application unit 18 is to read and/or write which record or, in other words, represents a correspondence relationship among a record, a CC-OCC 19S in charge, and a sub-application unit 18. With respect to each record, the "CC-OCC 19S in charge" refers to a CC-OCC 19S in charge of a read and/or a write of the record (allowed to read and/or write the record). For example, for each CC-OCC 19S, the mapping table 201 represents an ID of the CC-OCC 19S, an ID of the sub-application unit 18 capable of transmitting a read request and/or a write request for a record to the CC-OCC 19S, and an ID of a record which the CC-OCC 19S can read and write as the CC-OCC 19S in charge.

As described above, in the present embodiment, with respect to each transaction, sub-transactions and CC-OCCs 19S correspond to each other on a one-to-one basis and there is one CC-OCC 19S for each sub-application unit 18. In addition, in the mapping table 201, record IDs do not overlap with each other between sub-application units 18 (between CC-OCCs 19S). Accordingly, the invariant described above is maintained. As described earlier, record IDs may overlap with each other between sub-application units 18 (between CC-OCCs 19S) if transactions differ. For example, the sub-application unit 18A (CC-OCC 19SA) may read and/or write a record with a record ID of "001" in a given transaction and a sub-application unit 18B (CC-OCC 19SB) may read and/or write the record with the record ID of "001" in another transaction.

Hereinafter, an example of processing of Tx1 will be described with reference to FIGS. 7 to 11. Tx1 is an example of a transaction and $Tx1_{Sub1}$ and $Tx1_{Sub2}$ which constitute Tx1 are examples of a plurality of sub-transactions that constitute a transaction. BL1 is an example of a business logic and $BL1_{Sub1}$ and $BL1_{Sub2}$ which constitute BL1 are examples of a plurality of sub-business logics that constitute a business logic. Hereinafter, for ease of explanation, it is assumed that sub-business logics and sub-transactions are in a one-to-one relationship.

Figure 7:
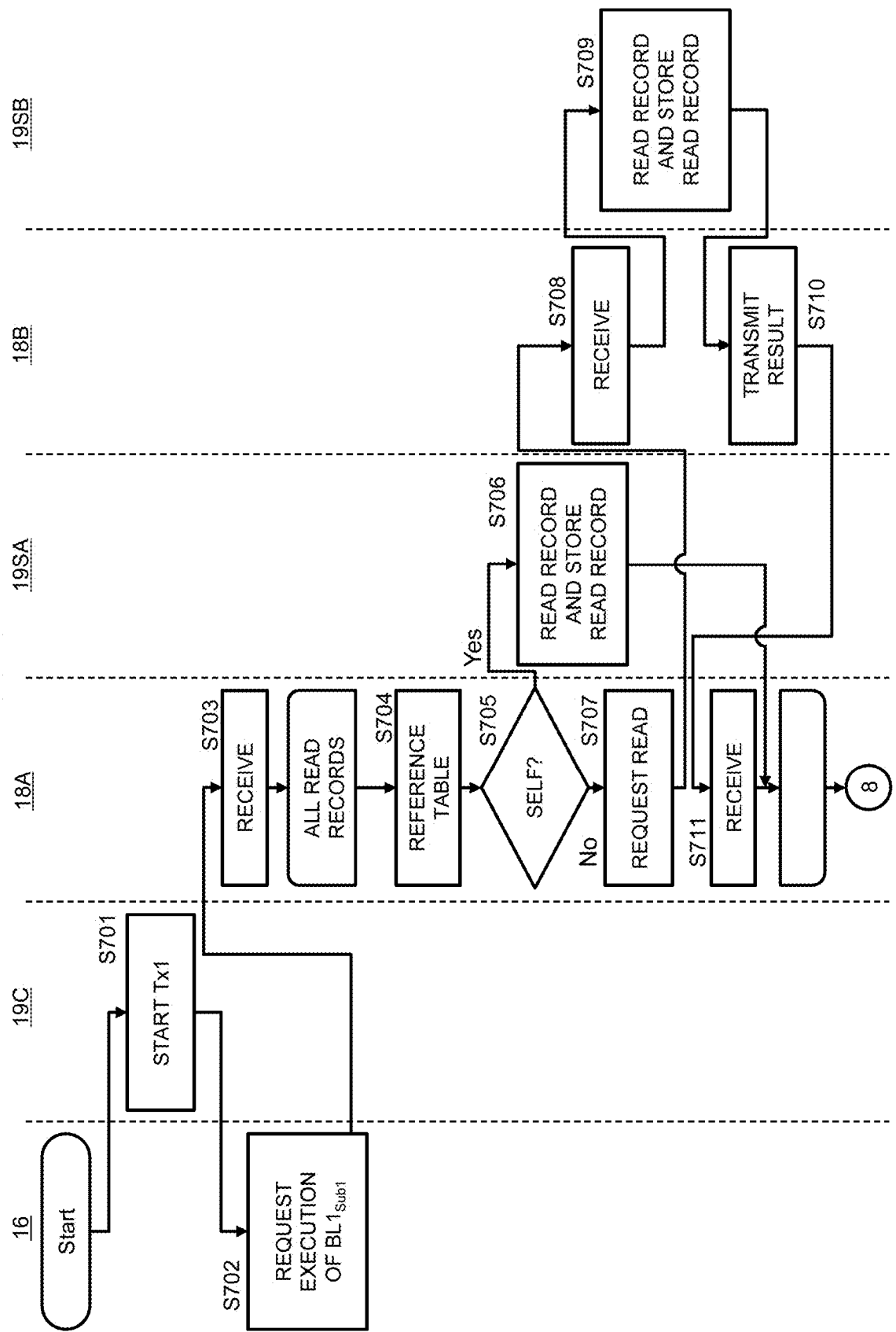
FIG. 7 shows a part of an example of a flow of processing of Tx1.

As shown in FIG. 7, the coordinator 16 causes the CC-OCC 19C to start Tx1 (S701).

$BL1_{Sub1}$ starts. Specifically, the coordinator 16 issues a request to the sub-application unit 18A to execute $BL1_{Sub1}$ (S702). $BL1_{Sub1}$ may be defined in the sub-application unit 18A in advance or may be dynamically created by the coordinator 16 and associated with the request transmitted in S702.

The sub-application unit 18A receives the execution request for $BL1_{Sub1}$ (S703). S704 to S711 are performed with respect to all read records (all records to be read) that are designated in $BL1_{Sub1}$. One read record will be considered as an example.

The sub-application unit 18A references the mapping table 201 of the sub-application unit 18A (the mapping table 201 corresponding to Tx1) (S704) and determines whether or not its own ID corresponds to an ID of the read record (whether or not the sub-application unit 18 capable of accessing the CC-OCC 19S in charge of the read record is the sub-application unit 18A) (S705). When the determination result of S705 is true, the sub-application unit 18A requests the CC-OCC 19SA to read the read record and the CC-OCC 19SA reads the record in response to the request and stores the record having been read in the memory of the DB client system 13A (S706). The read record is included in $RS_1$ in a snapshot (snapshot of Tx1) that is managed by the CC-OCC 19SA.

When the determination result of S705 is false, the sub-application unit 18A requests the sub-application unit 18B that corresponds to the ID of the read record (the sub-application unit 18 which is specified in the mapping table 201, i.e., the sub-application unit 18B which is capable of accessing the CC-OCC 19S in charge of the read record) to read the read record (S707). The sub-application unit 18B receives the request (S708) and requests the CC-OCC 19SB to read the read record. In doing so, the sub-application unit 18B may reference the mapping table 201 of the sub-application unit 18B (the mapping table 201 corresponding to Tx1), specify that the CC-OCC 19S in charge of the read record is the CC-OCC 19SB, and issue a request to the specified CC-OCC 19SB to read the read record. The CC-OCC 19SB reads the record in response to the request and stores the record having been read in the memory of the DB client system 13B (S709). The read record is included in $RS_1$ in a snapshot (snapshot of Tx1) that is managed by the CC-OCC 19SB. The sub-application unit 18B returns a result to the sub-application unit 18A being a request source (S710) and the sub-application unit 18A receives the result (S711).

Figure 8:
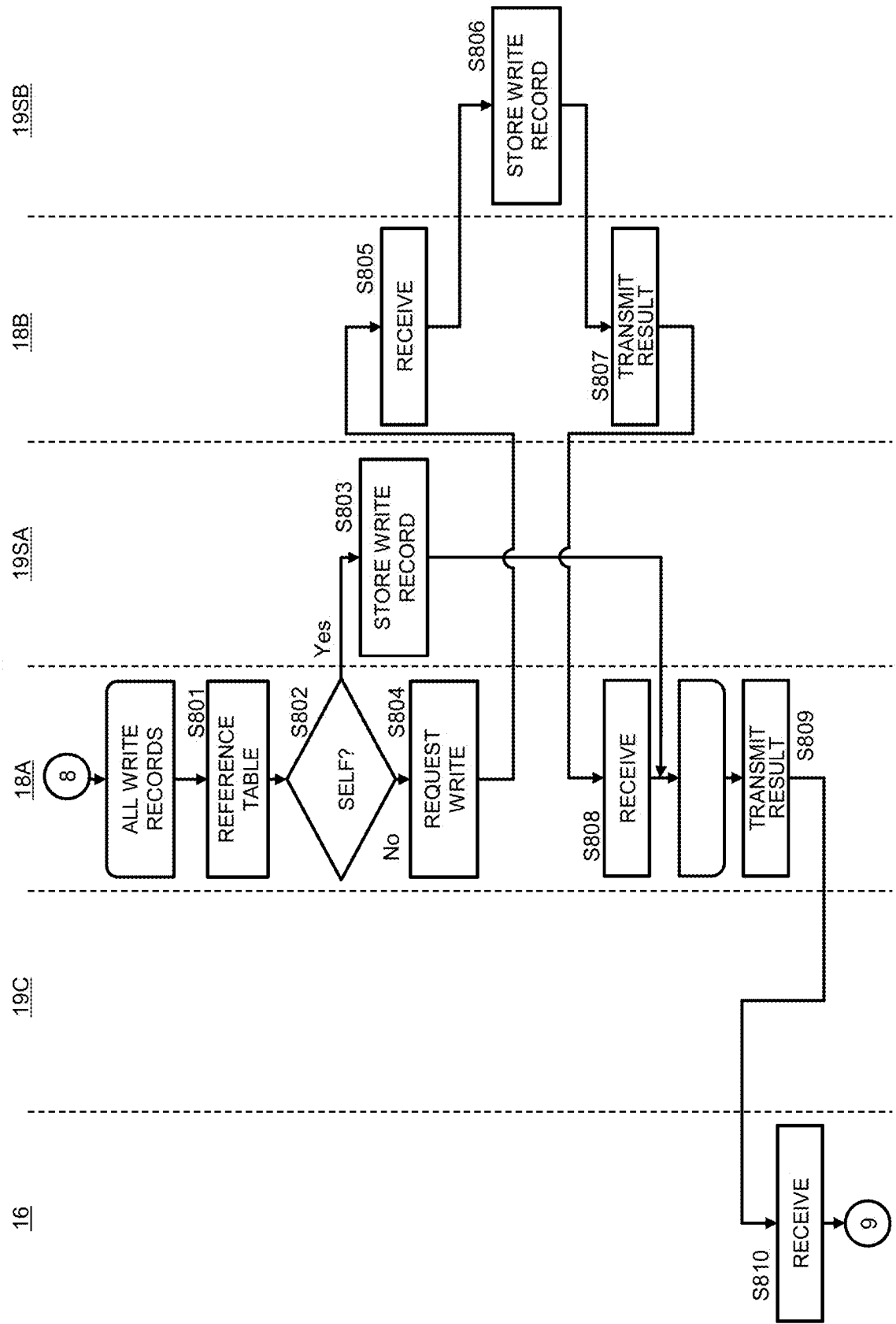
FIG. 8 shows a part of an example of a flow of processing of Tx1.

After S704 to S711 are completed with respect to all read records of $BL1_{Sub1}$, as shown in FIGS. 8, S801 to S808 in FIG. 8 are performed with respect to all write records (all records to be written) that are designated in $BL1_{Sub1}$. One write record will be considered as an example.

The sub-application unit 18A references the mapping table 201 of the sub-application unit 18A (the mapping table 201 corresponding to Tx1) (S801) and determines whether or not its own ID corresponds to an ID of the write record (whether or not the sub-application unit 18 capable of accessing the CC-OCC 19S in charge of the write record is the sub-application unit 18A) (S802). When the determination result of S802 is true, the sub-application unit 18A requests the CC-OCC 19SA to write the write record and the CC-OCC 19SA stores the write record in the memory of the DB client system 13A in response to the request (S803). The write record is included in WS in a snapshot (snapshot of Tx1) that is managed by the CC-OCC 19SA.

When the determination result of S802 is false, the sub-application unit 18A requests the sub-application unit 18B that corresponds to the ID of the write record to perform a write (S804). The sub-application unit 18B receives the request (S805) and requests the CC-OCC 19SB to write the write record. In doing so, the sub-application unit 18B may reference the mapping table 201 of the sub-application unit 18B (the mapping table 201 corresponding to Tx1), specify that the CC-OCC 19S in charge of the write record is the CC-OCC 19SB, and issue a request to the specified CC-OCC 19SB to write the write record. The CC-OCC 19SB stores the write record in the memory of the DB client system 13B in response to the request (S806). The write record is included in $WS_1$ in a snapshot (snapshot of Tx1) that is managed by the CC-OCC 19SB. The sub-application unit 18B returns a result to the sub-application unit 18A being a request source (S807) and the sub-application unit 18A receives the result (S808).

After S801 to S808 are completed with respect to all write records of $BL1_{Sub1}$, the sub-application unit 18A returns a result of $BL1_{Sub1}$ to the coordinator 16 (S809). The coordinator 16 receives the result (S810).

Figure 9:
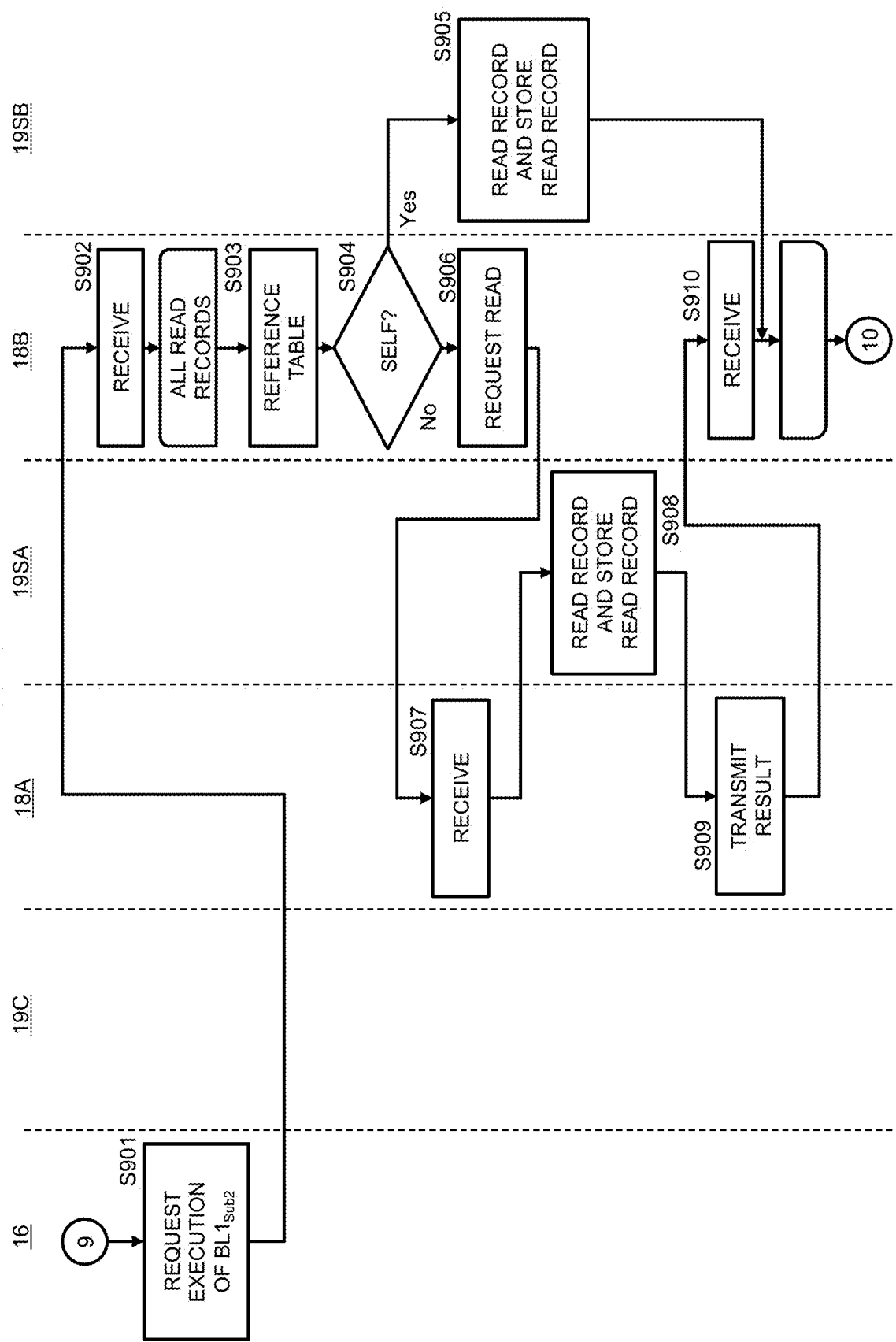
FIG. 9 shows a part of an example of a flow of processing of Tx1.

Next, $BL1_{Sub2}$ starts. Specifically, as shown in FIG. 9, the coordinator 16 issues a request to the sub-application unit 18B to execute $BL1_{Sub2}$ (S901). $BL1_{Sub2}$ may be defined in the sub-application unit 18B in advance or may be dynamically created by the coordinator 16 and associated with the request transmitted in S901.

The sub-application unit 18B receives the execution request for $BL1_{Sub2}$ (S902). S903 to S910 are performed with respect to all read records (all records to be read) that are designated in $BL1_{Sub2}$. One read record will be considered as an example.

The sub-application unit 18B references the mapping table 201 of the sub-application unit 18B (the mapping table 201 corresponding to Tx1) (S903) and determines whether or not its own ID corresponds to an ID of the read record (whether or not the sub-application unit 18 capable of accessing the CC-OCC 19S in charge of the read record is the sub-application unit 18B) (S904). When the determination result of S904 is true, the sub-application unit 18B requests the CC-OCC 19SB to read the read record and the CC-OCC 19SB reads the record in response to the request and stores the record having been read in the memory of the DB client system 13B (S905). The read record is included in $RS_2$ in a snapshot (snapshot of Tx1) that is managed by the CC-OCC 19SB.

When the determination result of S904 is false, the sub-application unit 18B requests the sub-application unit 18A that corresponds to the ID of the read record (the sub-application unit 18 which is specified in the mapping table 201, i.e., the sub-application unit 18A which is capable of accessing the CC-OCC 19S in charge of the read record) to read the read record (S906). The sub-application unit 18A receives the request (S907) and requests the CC-OCC 19SA to read the read record. The CC-OCC 19SA reads the record in response to the request and stores the record having been read in the memory of the DB client system 13A (S908). The read record is included in $RS_2$ in a snapshot (snapshot of Tx1) that is managed by the CC-OCC 19SA. The sub-application unit 18A returns a result to the sub-application unit 18B being a request source (S909) and the sub-application unit 18B receives the result (S910).

Figure 10:
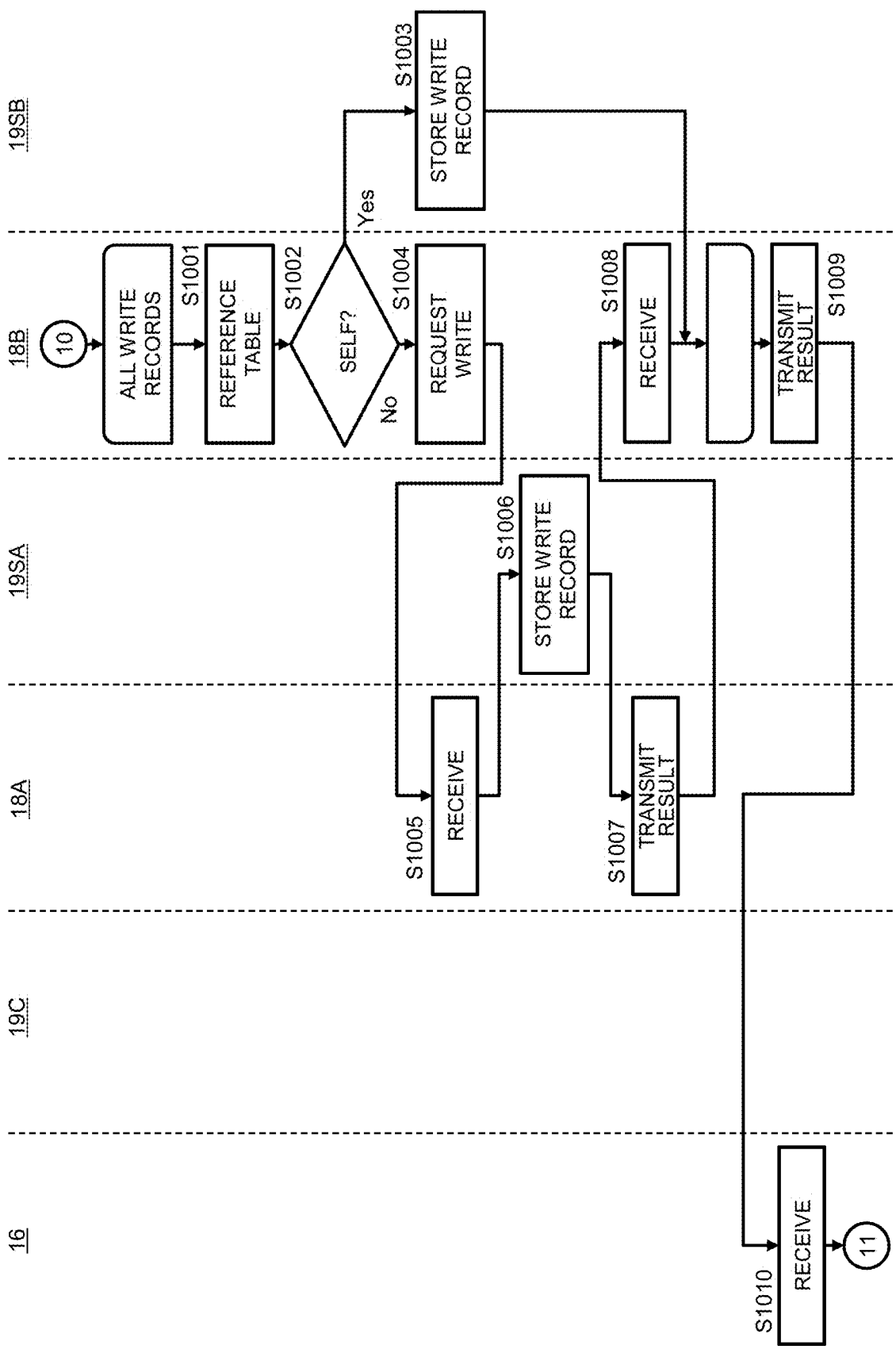
FIG. 10 shows a part of an example of a flow of processing of Tx1.

After S903 to S910 are completed with respect to all read records of $BL1_{Sub2}$, as shown in FIGS. 10, S1001 to S1008 in FIG. 10 are performed with respect to all write records (all records to be written) that are designated in $BL1_{Sub2}$. One write record will be considered as an example.

The sub-application unit 18B references the mapping table 201 of the sub-application unit 18B (S1001) and determines whether or not its own ID corresponds to an ID of the write record (whether or not the sub-application unit 18 capable of accessing the CC-OCC 19S in charge of the write record is the sub-application unit 18B) (S1002). When the determination result of S1002 is true, the sub-application unit 18B requests the CC-OCC 19SB to write the write record and the CC-OCC 19SB stores the write record in the memory of the DB client system 13B in response to the request (S1003). The write record is included in $WS_2$ in a snapshot (snapshot of Tx1) that is managed by the CC-OCC 19SB.

When the determination result of S1002 is false, the sub-application unit 18B requests the sub-application unit 18A that corresponds to the ID of the write record to perform a write (S1004). The sub-application unit 18A receives the request (S1005) and requests the CC-OCC 19SA to write the write record. The CC-OCC 19SA stores the write record in the memory of the DB client system 13A in response to the request (S1006). The write record is included in $WS_2$ in a snapshot (snapshot of Tx1) that is managed by the CC-OCC 19SA. The sub-application unit 18A returns a result to the sub-application unit 18B being a request source (S1007) and the sub-application unit 18B receives the result (S1008).

After S1001 to S1008 are completed with respect to all write records of $BL1_{Sub2}$, the sub-application unit 18B returns a result of $BL1_{Sub2}$ to the coordinator 16 (S1009). The coordinator 16 receives the result (S1010).

Figure 11:
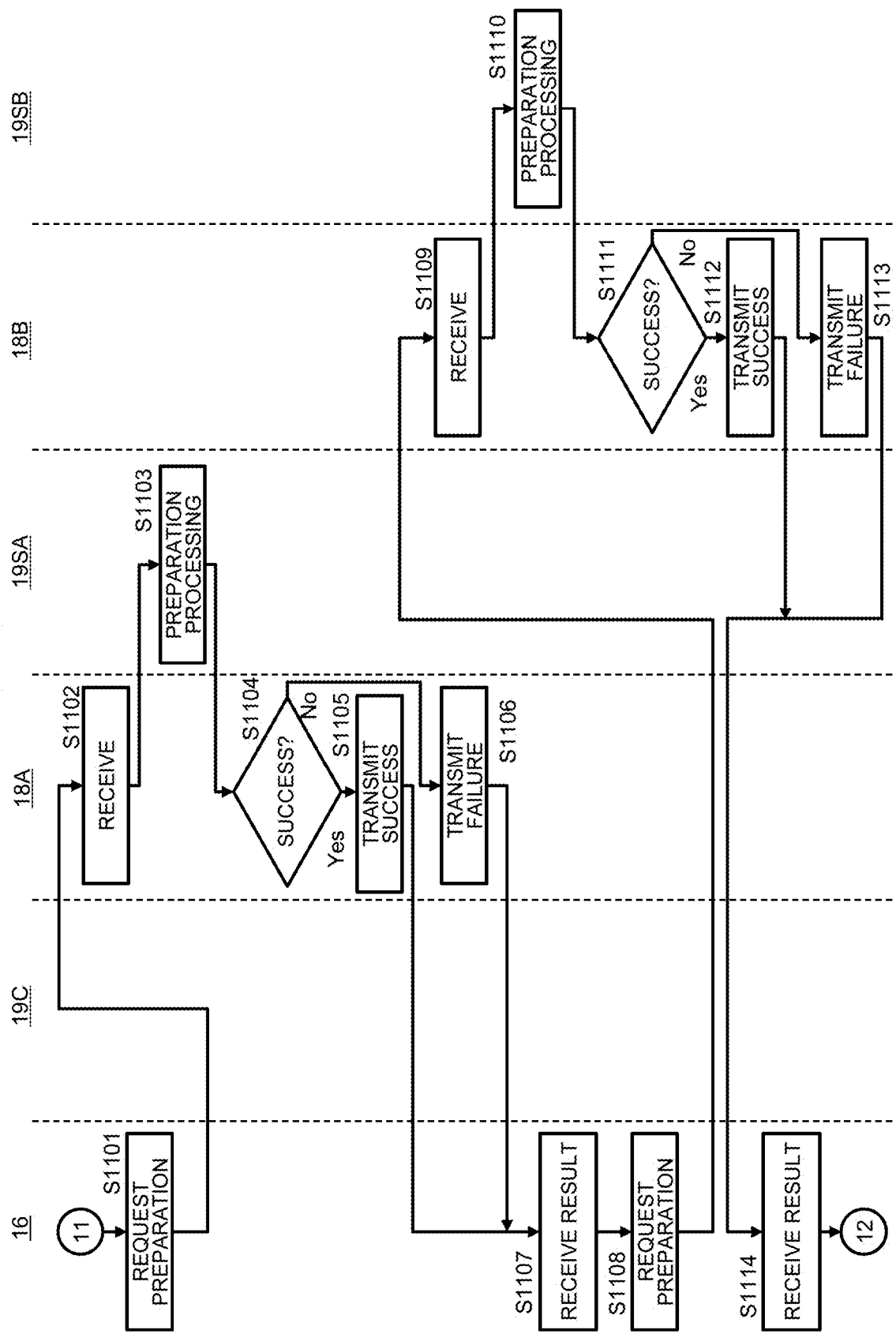
FIG. 11 shows a part of an example of a flow of processing of Tx1.

Next, as shown in FIG. 11, the coordinator 16 issues a preparation request in a two-phase commit to the sub-application unit 18A being a transmission destination of the execution request for $BL1_{Sub1}$ (S1101). The sub-application unit 18A receives the request (S1102), issues a request to the CC-OCC 19SA to perform preparation, and the CC-OCC 19SA performs preparation processing (S1103). The sub-application unit 18A determines whether or not the preparation processing was successful (S1004). When the determination result of S1104 is true, the sub-application unit 18A returns a result (response) of "success" to the coordinator 16 (S1105). When the determination result of S1104 is false, the sub-application unit 18A returns a result of "failure" to the coordinator 16 (S1106). The coordinator 16 receives the result from the sub-application unit 18 (S1107).

Processing similar to S1101 to S1107 of $BL1_{Sub1}$ is also performed with respect to $BL1_{Sub2}$ (S1108 to S1114).

Figure 12:
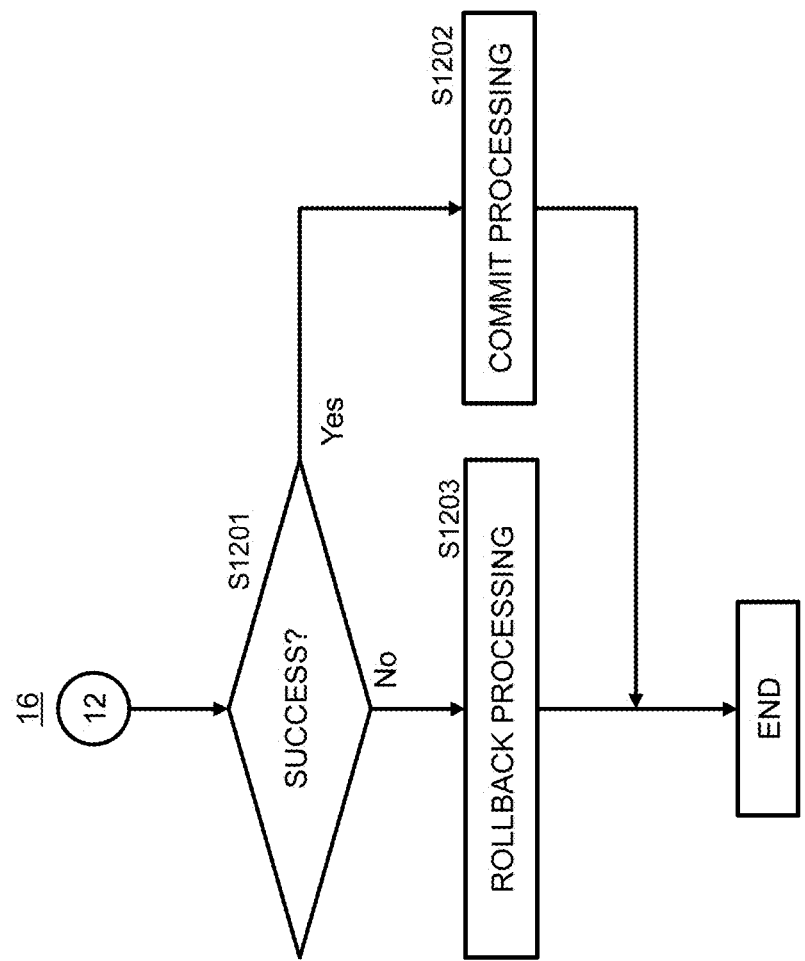
FIG. 12 shows a part of an example of a flow of processing of Tx1.

When the coordinator 16 receives a result of the preparation request from all sub-application units 18 being destinations of preparation requests, as shown in FIG. 12, the coordinator 16 determines whether or not all results are "success" (S1201). When the determination result in S1201 is true, the coordinator 16 performs commit processing of Tx1 (S1202). Specifically, the coordinator 16 transmits a commit request to all sub-application units 18 that are transmission destinations of sub-business logics related to Tx1 (all sub-application units that are transmission destinations of preparation requests). Accordingly, each sub-application unit 18 receives the commit request, requests the CC-OCC 19S to commit in response to the commit request, and the CC-OCC 19S commits to the DB 521. When the determination result in S1201 is false, the coordinator 16 performs rollback processing (S1203).

In the flows illustrated in FIGS. 7 to 12 described above, at least one of the following may be adopted.

An allocation destination of each of $BL1_{Sub1}$ and $BL1_{Sub2}$ may be automatically determined (for example, by the coordinator 16) or manually determined. For example, a table representing a correspondence relationship between sub-business logics and sub-application units may be prepared and, based on the table, the coordinator 16 may specify an allocation destination of a sub-business logic and transmit the sub-business logic to the sub-application unit being the allocation destination.

Processing of $BL1_{Sub1}$ (S702 to S810) and processing of $BL1_{Sub2}$ (S901 to S1010) may be performed in parallel.

Preparation of $BL1_{Sub1}$ (S1101 to S1107) and preparation of $BL1_{Sub2}$ (S1108 to S1114) may be performed in parallel.

This concludes the description of the present embodiment.

In the present embodiment, since sub-transactions and CC-OCCs 19S correspond to each other on a one-to-one basis for each transaction, in the invariant described earlier, N denotes the number of sub-transactions and i denotes a serial number (for example, an ID) of the sub-transactions. However, a sub-transaction and a CC-OCC 19S need not necessarily correspond to each other on a one-to-one basis with respect to at least one transaction. Therefore, in the invariant described earlier, N denotes the number of the CC-OCCs 19S and i denotes a serial number (for example, an ID) of the CC-OCCs 19S.

In addition, the invariant described earlier is satisfied if sub-transactions and sub-business logics correspond to each other on a one-to-one basis, sub-business logics and the sub-application units 18 correspond to each other on a one-to-one basis, the sub-application units 18 and the CC-OCCs 19S correspond to each other on a one-to-one basis, and records to be read and/or written do not overlap with each other between sub-business logics.

In the present embodiment, with respect to one transaction, the invariant described earlier is satisfied (records do not overlap with each other between CC-OCCs 19S) even when records to be read and/or written overlap with each other between sub-business logics. This is because, if the sub-application unit 18 capable of accessing the CC-OCC 19S in charge of a record which is designated in a sub-business logic is not the sub-application unit 18 having received the sub-business logic, the sub-application unit 18 having received the sub-business logic asks a sub-application unit 18 capable of accessing the CC-OCC 19S in charge of the record to read and/or write the record and a request for a read and/or a write of the record is transmitted to the CC-OCC 19S in charge from the sub-application unit 18 having been asked to read and/or write the record.

Figure 13A:
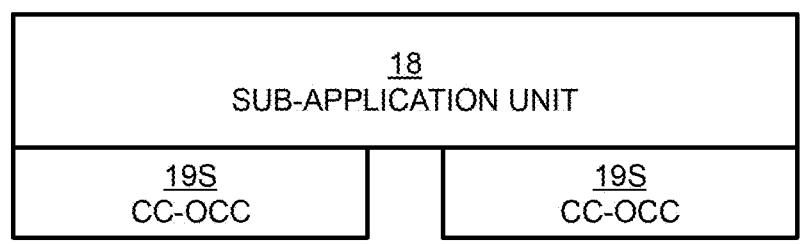
FIG. 13A shows an example of a relationship between a sub-application unit and CC-OCCs.
Figure 13B:
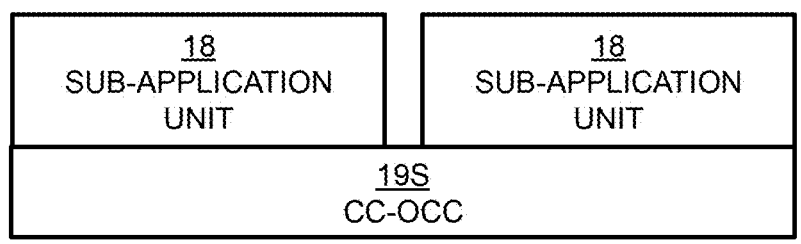
FIG. 13B shows an example of a relationship between sub-application units and a CC-OCC.

Note that the sub-application units 18 and the CC-OCCs 19S need not necessarily correspond to each other on a one-to-one basis. For example, as illustrated in FIG. 13A, two or more CC-OCCs 19S may exist for one sub-application unit 18 and, as illustrated in FIG. 13B, two or more sub-application units 18 may exist for one CC-OCC 19S. In this case, each sub-application unit 18 may be configured to comprehend, based on the mapping table 201, which CC-OCC 19S is in charge of which record and which sub-application unit 18 is capable of accessing the CC-OCC 19S. Accordingly, the invariant described earlier can be satisfied for each transaction.

In addition, the sub-application units 18 need not necessarily be capable of communicating with each other. In this case, for example, for each transaction, if records do not overlap with each other between sub-business logics and the sub-application unit 18 that is an allocation destination of each sub-business logic is a sub-application unit 18 capable of accessing the CC-OCC 19S in charge of a record being designated in the sub-business logic, the invariant described earlier is expected to be satisfied by having the coordinator 16 transmit each sub-business logic to the sub-application unit 18 (CC-OCC 19S) that is an allocation destination of the sub-business logic.

Furthermore, depending on an implementation of an adopted isolation level, the transmission of a preparation request to each sub-application unit 18 having executed a sub-business logic in each transaction may be issued in a single stage as illustrated in FIG. 11 or in multiple stages (not illustrated). For example, when a preparation request is to be issued in two stages, the preparation request of a first stage may be a request to change a state of a record to "prepared" (an example of a state signifying undetermined), and the preparation request of a second stage may be a request for validation involving reading a record from the DB 521 and checking whether or not the record matches a record on the memory. The coordinator 16 may execute the commit processing (S1202 in FIG. 12) when "success" is received with respect to all preparation requests from the respective sub-application units 18.

While an embodiment has been described above, the embodiment is merely an example for describing the present invention and is not intended to limit the scope of the present invention thereto. The present invention can also be implemented in various other modes.

For example, based on the description provided above, the following expressions are possible.

<Expression 1>

A transaction processing system, including:
  a plurality of sub-application units which execute a plurality of sub-business logics that constitute a business logic; and
  a plurality of CC-OCCs, wherein
  the plurality of CC-OCCs are included in a plurality of data source client systems,
  the plurality of data source client systems are a plurality of client systems corresponding to a data source server system which includes a plurality of objects,
  the data source server system and the plurality of data source client systems are one or a plurality of computer systems,
  each object is data representing a state of a target,
  each of the plurality of sub-application units is configured to
    transmit, in executing a sub-business logic, a read request and/or a write request for an object to be read and/or written to a CC-OCC in charge of the object in a data source client system including the sub-application unit, each of the plurality of CC-OCCs is a CC (Client Coordinated) transaction manager configured to perform OCC (Optimistic Concurrency Control), each of the plurality of CC-OCCs is configured to manage a snapshot for each transaction, with respect to each transaction, a snapshot of the transaction includes a read set which is a set of zero or more read objects and a write set which is a set of zero or more write objects, a read object is an object having been read in response to a read request for the object, a write object is an object to be written in response to a write request for the object, with respect to each transaction, when CC-OCCs which receive a read request and/or a write request for an object from two or more sub-application units in processing of M-number of (where M is an integer of 2 or more) sub-transactions that constitute the transaction are N-number of (where N is an integer of 2 or more) CC-OCCs, N-number of unions are pairwise disjoints, with respect to each of the N-number of unions, the union is a union of a read set and a write set in a snapshot which corresponds to the transaction and which is managed by a CC-OCC, and with respect to each of the M-number of sub-transactions, the sub-transaction is processed in executing a sub-business logic and includes a read request and/or a write request for an object from a sub-application unit to an CC-OCC.

<Expression 2>

The transaction processing system according to Expression 1, wherein each of the plurality of sub-application units is configured to make an in-charge determination which is a determination of whether or not the sub-application unit is a sub-application unit in charge, the application unit in charge is a sub-application unit capable of transmitting a read request and/or a write request for an object to be read and/or written with respect to a CC-OCC in charge of the object, when a result of the in-charge determination is true, transmit a read request and/or a write request for the object to the CC-OCC in charge of the object in a data source client system including the sub-application unit, and when a result of the in-charge determination is false, ask a sub-application unit in a data source client system including the CC-OCC in charge of the object to read and/or write the object.

<Expression 3>

The transaction processing system according to Expression 2, wherein mapping information representing which sub-application unit or which CC-OCC is in charge of which object is stored in each of the plurality of data source client systems, and each of the plurality of sub-application units is configured to make the in-charge determination based on the mapping information in a data source client system including the sub-application unit.

<Expression 4>

The transaction processing system according to any one of Expressions 1 to 3, further including a coordinator provided inside or outside of at least one of the plurality of sub-application units, wherein the coordinator is configured to start a transaction, issue, with respect to each of a plurality of sub-business logics related to the started transaction, a request to execute the sub-business logic to a sub-application unit, when receiving, with respect to each of the plurality of sub-business logics, a predetermined response of the sub-business logic from a sub-application unit having executed the sub-business logic, transmit one or more preparation requests to each of a plurality of sub-application units, and when receiving, from each sub-application unit, a predetermined response with respect to all preparation requests transmitted to the sub-application unit, transmit a commit request to each of the plurality of sub-application units.

<Expression 5>

A method, including:

executing a sub-business logic with a sub-application unit in a data source client system, a plurality of sub-application units executing a plurality of sub-business logics that constitute a business logic being included in a plurality of data source client systems corresponding to a data source server system that includes a plurality of objects, the data source server system and the plurality of data source client systems being one or a plurality of computer systems, each object being data representing a state of a target, in executing the sub-business logic, transmitting a read request and/or a write request for an object to be read and/or written to a CC-OCC in charge of the object, the plurality of data source client systems including a plurality of CC-OCCs, each of the plurality of CC-OCCs being a CC (Client Coordinated) transaction manager configured to perform OCC (Optimistic Concurrency Control), each of the plurality of CC-OCCs being configured to manage a snapshot for each transaction in a data source client system including the CC-OCC, with respect to each transaction, a snapshot of the transaction including a read set which is a set of zero or more read objects and a write set which is a set of zero or more write objects, a read object being an object having been read in response to a read request for the object, a write object being an object to be written in response to a write request for the object, with respect to each transaction, when CC-OCCs which receive a read request and/or a write request for an object from two or more sub-application units in processing of M-number of (where M is an integer of 2 or more) sub-transactions that constitute the transaction are N-number of (where N is an integer of 2 or more) CC-OCCs, N-number of unions being pairwise disjoints, with respect to each of the N-number of unions, the union being a union of a read set and a write set in a snapshot which corresponds to the transaction and which is managed by a CC-OCC, and with respect to each of the M-number of sub-transactions, the sub-transaction being processed in executing a sub-business logic and including a read request and/or a write request for an object from a sub-application unit to an CC-OCC.

REFERENCE SIGNS LIST

20 Transaction processing system

The invention claimed is:

1. A transaction processing system, comprising:
a plurality of sub-application units which execute a plurality of sub-business logics that constitute a business logic; and
a plurality of Client-Coordinated Optimistic Concurrency Controls (CC-OCCs), wherein
the plurality of CC-OCCs are included in a plurality of data source client systems,
the plurality of data source client systems are a plurality of client systems corresponding to a data source server system which includes a plurality of objects,
the data source server system and the plurality of data source client systems are one or a plurality of computer systems,
each object is data representing a state of a target,
with respect to each of the plurality of sub-application units, the sub-application unit is configured to
transmit, in executing a sub-business logic, a read request and/or a write request for an object to be read and/or written to a CC-OCC in charge of the object,
each of the plurality of CC-OCCs is a CC (Client Coordinated) transaction manager configured to perform OCC (Optimistic Concurrency Control),
the OCC includes performing validation based on a snapshot when committing,
each of the plurality of CC-OCCs is configured to manage a snapshot for each transaction,
with respect to each transaction, a snapshot of the transaction includes a read set, which is a set of zero or more read objects, and a write set, which is a set of zero or more write objects,
a read object is an object having been read in response to a read request for the object,
a write object is an object to be written in response to a write request for the object,
with respect to each transaction, when CC-OCCs which receive a read request and/or a write request for an object from two or more sub-application units in processing of M-number of (where M is an integer of 2 or more) sub-transactions created by dividing the transaction are N-number of (where N is an integer of 2 or more) CC-OCCs,
N-number of unions are pairwise disjoints,
with respect to each of the N-number of unions, the union is a union of a read set and a write set in a snapshot which corresponds to the transaction and which is managed by a CC-OCC, and
with respect to each of the M-number of sub-transactions, the sub-transaction is processed in executing a sub-business logic and includes a read request and/or a write request for an object from a sub-application unit to an CC-OCC.

2. A transaction processing system, comprising:
a plurality of sub-application units which execute a plurality of sub-business logics that constitute a business logic; and
a plurality of Client-Coordinated Optimistic Concurrency Controls (CC-OCCs), wherein
the plurality of CC-OCCs are included in a plurality of data source client systems,
the plurality of data source client systems are a plurality of client systems corresponding to a data source server system which includes a plurality of objects,
the data source server system and the plurality of data source client systems are one or a plurality of computer systems,
each object is data representing a state of a target,
each of the plurality of CC-OCCs is a CC (Client Coordinated) transaction manager configured to perform OCC (Optimistic Concurrency Control),
the OCC includes performing validation based on a snapshot when committing,
each of the plurality of CC-OCCs is configured to manage a snapshot for each transaction,
with respect to each transaction, a snapshot of the transaction includes a read set, which is a set of zero or more read objects, and a write set, which is a set of zero or more write objects,
a read object is an object having been read in response to a read request for the object,
a write object is an object to be written in response to a write request for the object,
with respect to each transaction, when CC-OCCs which receive a read request and/or a write request for an object from two or more sub-application units in processing of M-number of (where M is an integer of 2 or more) sub-transactions created by dividing the transaction are N-number of (where N is an integer of 2 or more) CC-OCCs,
N-number of unions are pairwise disjoints,
with respect to each of the N-number of unions, the union is a union of a read set and a write set in a snapshot which corresponds to the transaction and which is managed by a CC-OCC,
with respect to each of the M-number of sub-transactions, the sub-transaction is processed in executing a sub-business logic and includes a read request and/or a write request for an object from a sub-application unit to an CC-OCC,
with respect to each of the plurality of sub-application units, the sub-application unit is configured to
make, in executing a sub-business logic, an in-charge determination which is a determination of whether or not the sub-application unit is a sub-application unit in charge,
the sub-application unit in charge is a sub-application unit capable of transmitting a read request and/or a write request for an object to be read and/or written to a CC-OCC in charge of the object,
when a result of the in-charge determination is true, transmit a read request and/or a write request for the object to the CC-OCC in charge of the object in a data source client system including the sub-application unit, and
when a result of the in-charge determination is false, ask a sub-application unit in a data source client system including the CC-OCC in charge of the object to read and/or write the object.

3. The transaction processing system according to claim 2, wherein
mapping information representing which sub-application unit or which CC-OCC is in charge of which object is stored in each of the plurality of data source client systems, and
each of the plurality of sub-application units is configured to make the in-charge determination, based on the mapping information in a data source client system including the sub-application unit.

4. The transaction processing system according to any one of claims 1 to 3, further comprising:
a coordinator provided inside or outside of at least one of the plurality of sub-application units,
wherein the coordinator is configured to:
   start a transaction,
   issue, with respect to each of a plurality of sub-business logics related to the started transaction, a request to execute the sub-business logic to a sub-application unit,
   when receiving, with respect to each of the plurality of sub-business logics, a predetermined response of the sub-business logic from a sub-application unit having executed the sub-business logic, transmit one or more preparation requests to each of a plurality of sub-application units, and
   when receiving, from each sub-application unit, a predetermined response with respect to all preparation requests transmitted to the sub-application unit, transmit a commit request to each of the plurality of sub-application units.

5. A method comprising:
a step of executing a sub-business logic with a sub-application unit in a data source client system; and
a step of transmitting, in executing the sub-business logic, a read request and/or a write request for an object to be read and/or written to a Client-Coordinated Optimistic Concurrency Control (CC-OCC) in charge of the object, wherein
a plurality of sub-application units executing a plurality of sub-business logics that constitute a business logic are included in a plurality of data source client systems corresponding to a data source server system including a plurality of objects,
the data source client system is any of the plurality of data source client systems,
the sub-application unit is any of the plurality of sub-application units,
the data source server system and the plurality of data source client systems are one or a plurality of computer systems,
each object is data representing a state of a target, the plurality of data source client systems include a plurality of CC-OCCs,
each of the plurality of CC-OCCs is a CC (Client Coordinated) transaction manager configured to perform OCC (Optimistic Concurrency Control),
the OCC includes performing validation based on a snapshot when committing,
each of the plurality of CC-OCCs is configured to manage a snapshot for each transaction in a data source client system including the CC-OCC,
with respect to each transaction, a snapshot of the transaction includes a read set, which is a set of zero or more read objects, and a write set, which is a set of zero or more write objects,
a read object is an object having been read in response to a read request for the object,
a write object is an object to be written in response to a write request for the object,
with respect to each transaction, when CC-OCCs which receive a read request and/or a write request for an object from two or more sub-application units in processing of M-number of (where M is an integer of 2 or more) sub-transactions created by dividing the transaction are N-number of (where N is an integer of 2 or more) CC-OCCs,
N-number of unions are pairwise disjoints,
with respect to each of the N-number of unions, the union is a union of a read set and a write set in a snapshot which corresponds to the transaction and which is managed by a CC-OCC,
with respect to each of the M-number of sub-transactions, the sub-transaction is processed in executing a sub-business logic and includes a read request and/or a write request for an object from a sub-application unit to an CC-OCC.

6. A method, comprising:
a step of making, in executing a sub-business logic with a sub-application unit in a data source client system, an in-charge determination which is a determination of whether or not the sub-application unit is a sub-application unit in charge;
a step of, when a result of the in-charge determination is true, transmitting a read request and/or a write request for an object with the sub-application unit to a Client-Coordinated Optimistic Concurrency Control (CC-OCC) in charge of the object in a data source client system including the sub-application unit; and
when a result of the in-charge determination is false, asking, from the sub-application unit, another sub-application unit in another data source client system including the CC-OCC in charge of the object to read and/or write the object, wherein
a plurality of sub-application units executing a plurality of sub-business logics that constitute a business logic are included in a plurality of data source client systems corresponding to a data source server system are including a plurality of objects,
the data source client system is any of the plurality of data source client systems,
the other data source client system is any of the plurality of data source client systems and is a different data source client system from the data source client system,
the sub-application unit is any of the plurality of sub-application units,
the other sub-application unit is any of the plurality of sub-application units and is a different sub-application unit from the sub-application unit,
the data source server system and the plurality of data source client systems are one or a plurality of computer systems,
each object is data representing a state of a target,
the plurality of data source client systems include a plurality of CC-OCCs,
each of the plurality of CC-OCCs is a CC (Client Coordinated) transaction manager configured to perform OCC (Optimistic Concurrency Control),
the OCC includes performing validation, based on a snapshot when committing,
each of the plurality of CC-OCCs is configured to manage a snapshot for each transaction in a data source client system including the CC-OCC,
with respect to each transaction, a snapshot of the transaction includes a read set, which is a set of zero or more read objects, and a write set, which is a set of zero or more write objects,
a read object is an object having been read in response to a read request for the object,
a write object is an object to be written in response to a write request for the object, with respect to each transaction, when CC-OCCs which receive a read request and/or a write request for an object from two or more sub-application units in processing of M-number of (where M is an integer of 2 or more) sub-transactions created by dividing the transaction are N-number of (where N is an integer of 2 or more) CC-OCCs, N-number of unions are pairwise disjoints, with respect to each of the N-number of unions, the union is a union of a read set and a write set in a snapshot which corresponds to the transaction and which is managed by a CC-OCC, with respect to each of the M-number of sub-transactions, the sub-transaction is processed in executing a sub-business logic and includes a read request and/or a write request for an object from a sub-application unit to an CC-OCC.

* * * * *